United States Patent
Cai

(10) Patent No.: US 12,057,793 B2
(45) Date of Patent: Aug. 6, 2024

(54) METHOD FOR POSITIONING ROTOR OF SWITCHED RELUCTANCE MOTOR WITH PULSE NUMBER BEING SELF-ADJUSTABLE ALONG WITH SPEED

(71) Applicant: Changsha University of Science and Technology, Hunan (CN)

(72) Inventor: Hui Cai, Hunan (CN)

(73) Assignee: Changsha University of Science and Technology, Changsha (CN)

(*) Notice: Subject to any disclaimer, the term of this patent is extended or adjusted under 35 U.S.C. 154(b) by 0 days.

(21) Appl. No.: 17/918,324

(22) PCT Filed: May 27, 2022

(86) PCT No.: PCT/CN2022/095554
§ 371 (c)(1),
(2) Date: Oct. 11, 2022

(87) PCT Pub. No.: WO2022/253130
PCT Pub. Date: Dec. 8, 2022

(65) Prior Publication Data
US 2024/0213899 A1    Jun. 27, 2024

(30) Foreign Application Priority Data
Jun. 3, 2021    (CN) .......................... 202110617061.2

(51) Int. Cl.
*H02P 21/18* (2016.01)
*H02P 25/08* (2016.01)

(52) U.S. Cl.
CPC .............. *H02P 21/18* (2016.02); *H02P 25/08* (2013.01); *H02P 2203/01* (2013.01)

(58) Field of Classification Search
CPC ........ H02P 21/18; H02P 25/08; H02P 2203/01
See application file for complete search history.

(56) References Cited

U.S. PATENT DOCUMENTS

| | | | | |
|---|---|---|---|---|
| 4,943,760 A * | 7/1990 | Byrne | .................... | H02K 19/24 318/701 |
| 6,291,949 B1 * | 9/2001 | Green | .................... | H02P 6/185 318/400.11 |
| 6,850,029 B1 * | 2/2005 | Pollock | .................... | H02P 25/08 318/727 |
| 7,288,915 B2 * | 10/2007 | Norman | .................. | H02P 6/185 318/432 |
| 8,217,605 B2 * | 7/2012 | Balazovic | ............... | H02P 23/14 318/632 |

\* cited by examiner

*Primary Examiner* — Rina I Duda

(57) ABSTRACT

The present invention discloses an all-speed-range estimation method for a rotor position of a switched reluctance motor. Under a low-speed working condition, a sector is selected for triggering according to comparison between a current response value and a current threshold, so as to determine the rotor position of the motor; under a medium-speed working condition, the rotor position of the motor is determined, according to a change of the number of injected pulses with the motor speed, by querying a preset data table; under a high-speed working condition, a capacitor charging loop is designed since there is a small number of injected pulses; a response current formed by during injection of a pulse voltage charges a capacitor; the capacitor is detected to measure a voltage; and the rotor position is determined by querying a preset voltage-rotor position data table according to a voltage value.

6 Claims, 4 Drawing Sheets

METHOD FOR POSITIONING ROTOR OF SWITCHED RELUCTANCE MOTOR WITH PULSE NUMBER BEING SELF-ADJUSTABLE ALONG WITH SPEED

FIELD OF THE INVENTION

The present application relates to the technical field of motors, in particular to a method for positioning a rotor of a switched reluctance motor with the pulse number being self-adjustable along with speed.

BACKGROUND OF THE INVENTION

A high-frequency injection method is often used for motor rotor position estimation. Usually, a high-frequency pulse voltage is injected into an idle phase of a motor; an accurate position of the motor is acquired according to a current response. However, injection of a traditional fixed number of pulses at different speeds will cause a practical engineering problem and cause an inaccurate position and angle of the motor rotor. Especially when the motor runs at a high speed, the number of injected pulses gradually decreases, and even one pulse cannot be injected. Therefore, it is necessary to design a new rotor position estimation method for the above problems.

SUMMARY OF INVENTION

The present application aims to provide a method for positioning a rotor of a switched reluctance motor with the pulse number being self-adjustable along with speed for the above problems, so that adaptive adjustment of injected pulses at different speed ranges is achieved, and rotor position estimation within an all-speed range is achieved.

Optionally, in the method for positioning a rotor of a switched reluctance motor, when the motor runs at a low-speed section, a current threshold is set to determine a phase change moment; and the threshold is adaptively adjusted with a bus voltage.

Optionally, in the method for positioning a rotor of a switched reluctance motor, when the motor runs at a medium-speed section, the number of injected pulses changes with the motor speed, and is selected and determined according to data of a preset curve or table; and the data of the preset curve or table here is determined according to an actual need.

Optionally, a current peak of a single pulse current is hard to capture in an actual system, a current pulse is used to charge a capacitor, and the capacitor voltage is detected; an actual rotor position is acquired according to a mapping relationship between the voltage and a rotor position; and the problem of limitation to a sampling frequency of a chip is solved.

Optionally, the relationship between the capacitor voltage and the rotor position is linearly fit or is stored in a preset table; and the corresponding rotor position is detected and queried subsequently according to the acquired voltage.

The present invention has the beneficial effects below.

The present invention combines a low-speed high-frequency pulse injection method, a medium-speed injection method in which the number of pulses changes with speed, and an injection method for a single pulse or a small number of pulses during high-speed running to achieve estimation of a rotor position within an all-speed range. According to the effect of the Summary of invention 1, a motor speed range can be divided into three sections, and different control strategies are applied according to different sections, which is more targeted and improves the motor rotor position recognition accuracy in each speed section. According to the effect of the Summary of invention 2, two thresholds can be set to determine a motor phase change moment, and the threshold is changed and adjusted along with speed, so that the phase change position is more accurate. According to the effect of the Summary of invention 3, in setting of the thresholds, fluctuations of the bus voltage are fully considered, so that the thresholds are closer to a real running condition of the motor; the thresholds are compensated according to a change in the bus voltage, so that the calculation and estimation of the phase change position and rotor position are more accurate. According to the effect of the Summary of invention 4, when the motor runs at the medium-speed section, the number of injected pulses is adjusted and changed along with speed, so that the defect of a few of pulses within the next phase change cycle at a higher speed is overcome, and the rotor position recognition accuracy is improved. According to the effect of the Summary of invention 5, the current response of a single pulse is hard to capture. The current response at the corresponding position is represented by detecting the capacitor voltage, so that the feature recognition degree of the special position point is improved, and the problem of detection of the current response of a pulse at a high speed is solved; and the rotor position is recognized more accurately at a high speed.

This method achieves an all-speed-range position-sensor-free technology for a motor in aspects of low speed, medium speed and high speed. This method is a low-cost substitution for a position sensor.

DETAILED DESCRIPTION OF ILLUSTRATED EMBODIMENTS

In order to make those skilled in the art better understand the solutions of the present invention, the technical solutions in the embodiments of the present invention will be described clearly and completely below in combination with the drawings in the embodiments of the present invention. Obviously, the embodiments described herein are only part of the embodiments of the present invention, not all the embodiments. Based on the embodiments in the present invention, all other embodiments obtained by those of ordinary skill in the art without creative work shall fall within the protection scope of the present invention.

Figure 1:
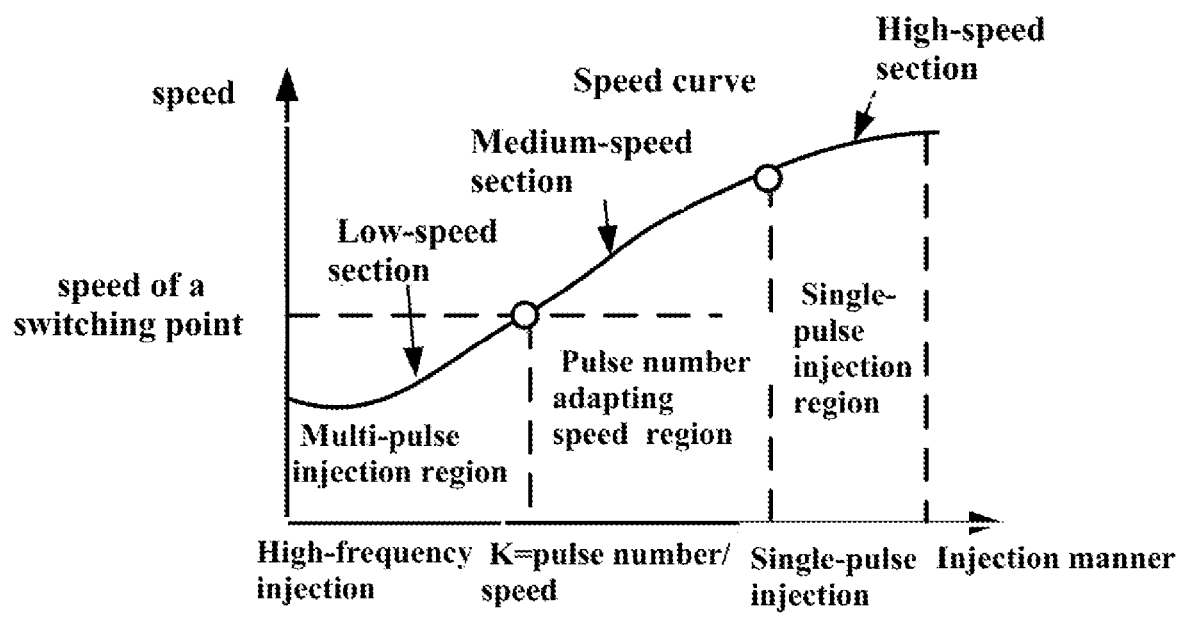
FIG. 1 is a diagram of division of a speed range of a switched reluctance motor in a method for positioning a rotor of a switched reluctance motor with the pulse number being self-adjustable along with speed disclosed by an embodiment of the present application.

Referring to FIG. 1, a speed range of a switched reluctance motor is divided into three regions in a method for positioning a rotor of a switched reluctance motor with the pulse number being self-adjustable along with speed disclosed by an embodiment of the present invention. The division principle is based on the following characteristics:

It can be known from the faraday's law, when a current flows through a stator winding, an instantaneous voltage at two ends of a single-phase winding is related to a magnetic flux in the winding, and a formula is as follows:

$$V_{ph} = iR + \frac{\partial \lambda}{\partial i}\frac{di}{dt} + \frac{\partial \lambda}{\partial \theta}\frac{d\theta}{dt} = iR + L_{inc}\frac{di}{dt} + K_v \omega$$

wherein $V_{ph}$ is a direct current bus voltage; i is an instantaneous phase current; R is a resistance of the winding; $\lambda$ is magnetic flux of a connecting coil; $L_{inc}$ is an incremental inductance; $K_v$ is a current-dependent counter electromotive force coefficient; and $\omega$ is an angular speed of a rotor. A magnetic flux linkage has a nonlinear mapping relationship with the rotor position and the current.

A voltage expression can be further simplified as:

$$V_{ph} = iR + L(\theta)\frac{di}{dt} + i\frac{dL(\theta)}{dt}\omega$$

As the motor speed increases, an effective voltage that can be applied to two ends of the motor winding gradually decreases; a change rate of the current in the motor winding decreases; the current response slows down; due to the two factors, i.e. slow current response and reduction of an injection interval after the speed increases, the fixed pulse injection in a traditional voltage pulse injection method is not suitable for a high-speed working condition. Therefore, the working condition of the motor is divided into a low-speed section, a medium-speed section and a high-speed section in comprehensive consideration of the motor speed and an actual on-off frequency of a controller. The three speed sections respectively correspond to a high-frequency injection region, a pulse number and speed proportioning region and a single-pulse injection region.

Figure 2:
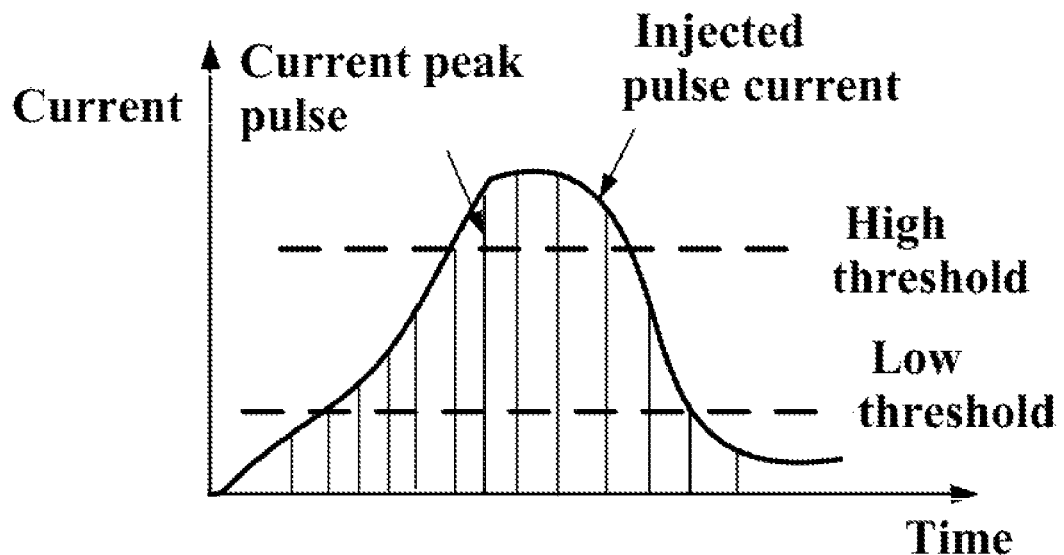
FIG. 2 is a diagram of a relationship between a rotor position and a current peak of pulse injection at a low-speed section in a method for positioning a rotor of a switched reluctance motor with the pulse number being self-adjustable along with speed disclosed by an embodiment of the present application.
Figure 3:
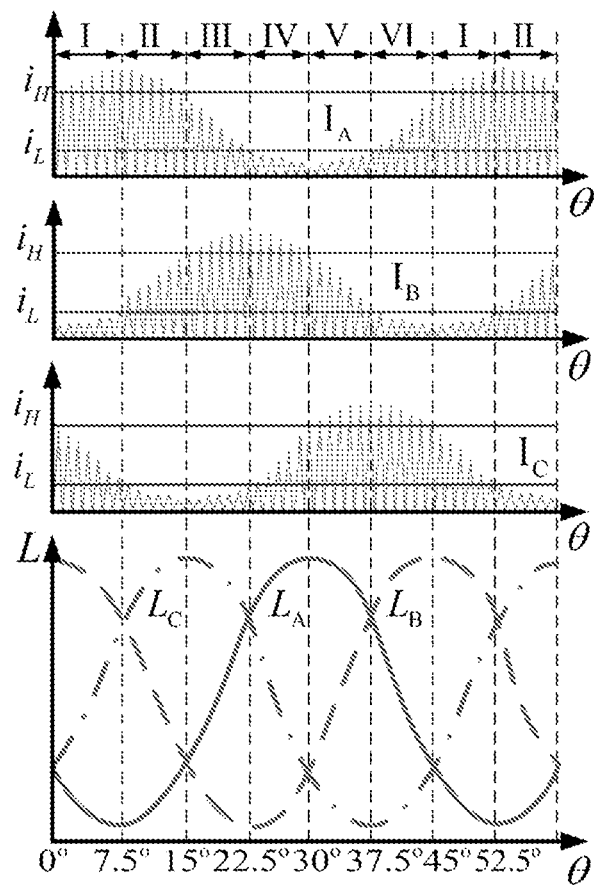
FIG. 3 shows a current response feature and current logic when a current is at different rotor positions in a method for positioning a rotor of a switched reluctance motor with the pulse number being self-adjustable along with speed disclosed by an embodiment of the present application.

Referring to FIG. 2, in view of rotor positioning at the low-speed section in the method for positioning a rotor of a switched reluctance motor with the pulse number being self-adjustable along with speed, one phase is used to drive excitation, and the other two idle phases are used to determine the rotor position of the switched reluctance motor; a high-frequency current is injected into the idle phases; current peaks of pulse injection are also different according to different positions; and the current peak is related to the rotor position. Two current thresholds including a low threshold and a high threshold are defined first. When the peak of the current response is less than the low threshold, a section is selected to trigger phase driving excitation; and when the peak of the current response is greater than the high threshold, a corresponding section is selected to trigger a position estimation algorithm. The section division is as shown in FIG. 3. If a time interval between two feature points is extremely short, it is generally considered that a speed between position update points is constant, and the motor rotor position estimation $\theta_{est}$ at any moment can be expressed as:

$$\theta_{est} = \theta_k + \int_{t_k}^{t_1} \frac{\Delta \theta}{\Delta t_k} dt$$

wherein $\theta_k$ is an inductance intersection angle; $\Delta\theta$ is an angle difference stabilized at 7.5° of the two position update points; $\Delta t_k$ is an interval when the rotor passes through the two update points; $t_k$ is the moment of a $k^{th}$ output update point; $t_1$ is any output moment between the two position points; in the table, the moment of the response current magnitude is the moment when a current logic changes; the section refers to the division of the rotor in FIG. 3; the rotor position corresponds to a change of the current logic; and the initial conduction phase is a phase to be excited at the moment of logic occurrence.

| Logic of response current magnitude | Section | Rotor position | Initial conduction phase |
|---|---|---|---|
| $I_A > I_H$ & $I_B < I_L$ | I | 0° | C |
| $I_A > I_H$ & $I_C < I_L$ | II | 7.5° | C |
| $I_B > I_H$ & $I_C < I_L$ | III | 15° | A |
| $I_B > I_H$ & $I_A < I_L$ | IV | 22.5° | A |
| $I_C > I_H$ & $I_A < I_L$ | V | 30° | B |
| $I_C > I_H$ & $I_B < I_L$ | VI | 37.5° | B |

Referring to FIG. 2, at the low-speed section, switching from one sector to another sector depends on triggering of a threshold, but the original selection of a threshold also considers a direct current bus voltage. For a battery-powered system, a voltage of a battery changes frequently and in a large range, which generates great impact on the estimation of the motor rotor position selected based on the threshold. In order to keep the threshold unchanged, it is determined that the threshold is kept constant under different working conditions based on the voltage proportionally-changed duty ratio. The voltage duty ratio has a linear relationship with the bus voltage. Specifically, voltage duty ratios that can keep the threshold constant at different voltages need to be measured, and related values are recorded. A polynomial relationship between the voltage duty ratio and the voltage is searched by measuring a plurality of discrete points and fitting. After it is detected that a voltage changes, a desired voltage duty ratio is calculated through a fitting formula.

The fitting formula can be expressed as:

$$I_{th} = m(\theta)U_{dc} + n(\theta)$$

wherein m(θ) and n(θ) are coefficients changing with different positions. The duty ratio can be adjusted according to this relational expression. The following should be considered for the selection of an estimated position: (1) a relative error of position estimation is smaller if a threshold current change of a reference position is selected, which can ensure the estimation accuracy; (2) the threshold current of the reference position should not be too small, otherwise, tiny detection accuracy problem will cause a large relative error from an actual value; and (3) when the measurement accuracy is guaranteed, the threshold current of the reference position should not be too large, so as to avoid the problem of a negative torque caused by pulse current. In conclusion, pulses are injected into a non-conducting phase. When a calculated pulse current peak reaches a preset threshold, the position is updated to complete position estimation.

Figure 4:
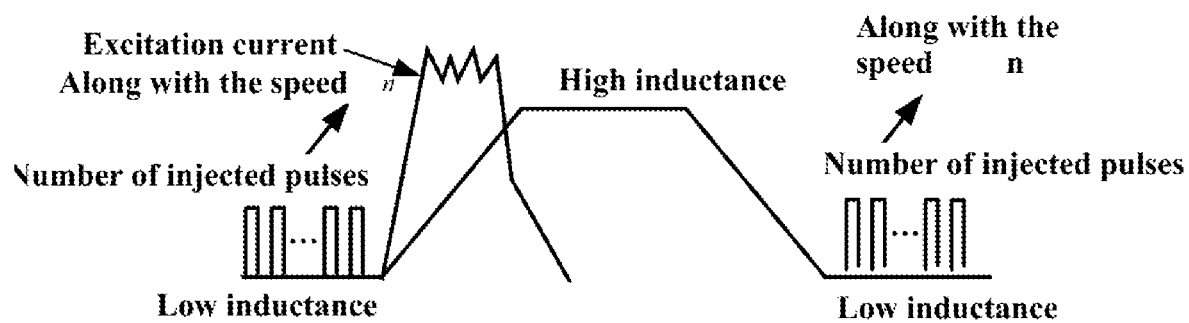
FIG. 4 is a current waveform diagram when a motor runs at a medium-speed section in a method for positioning a rotor of a switched reluctance motor with the pulse number being self-adjustable along with speed disclosed by an embodiment of the present application.

Referring to FIG. 4, when the motor runs at the medium-speed section, the number of injected pulses is limited by the motor speed; at this time, the number of injected pulses changes with the motor speed, and is selected and determined according to data of a preset curve or table; the data of the preset curve or table here is determined according to specific power of a controller chip and the motor. According to a standard that a speed of 1000 rpm corresponds to 10 pulses, if the speed increases, the number of pulses also increases.

Figure 5:
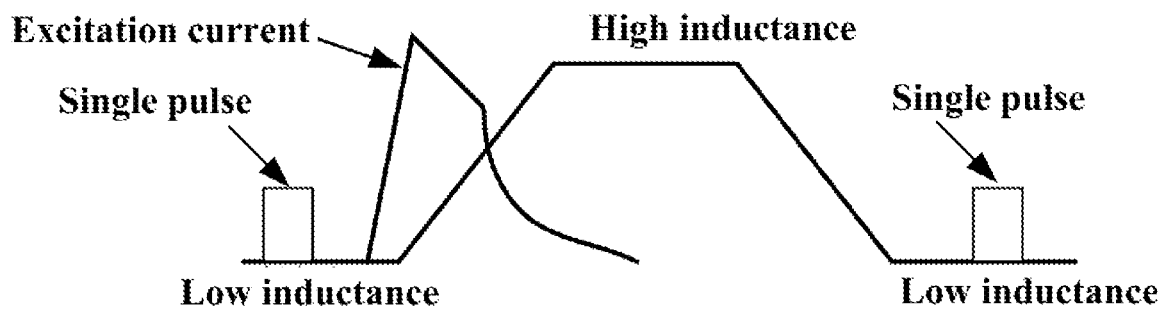
FIG. 5 is a current waveform diagram when a motor runs at a high-speed section in a method for positioning a rotor of a switched reluctance motor with the pulse number being self-adjustable along with speed disclosed by an embodiment of the present application.

Referring to FIG. 5, during high-speed running, the pulse injection method is hard to implement. Since a counter electromotive force is high, the phase current controllability is poor. In a torque control mode, running in a single-pulse mode can be achieved, and excitation is kept in the entire conducted section. The tail of a high phase current in a high-speed state will generally extend to a region of (dL/dθ)<0. A current freewheeling section may possibly occupy most of a negative torque region, which causes that this idle phase has little or no time for rotor position estimation with pulse injection. Therefore, at a high speed, it should be fully considered that an injection section can be used for pulse injection. At this time, a single pulse is selected to be injected. Injection of the single pulse shown in FIG. 5 is taken as an example.

Figure 6:
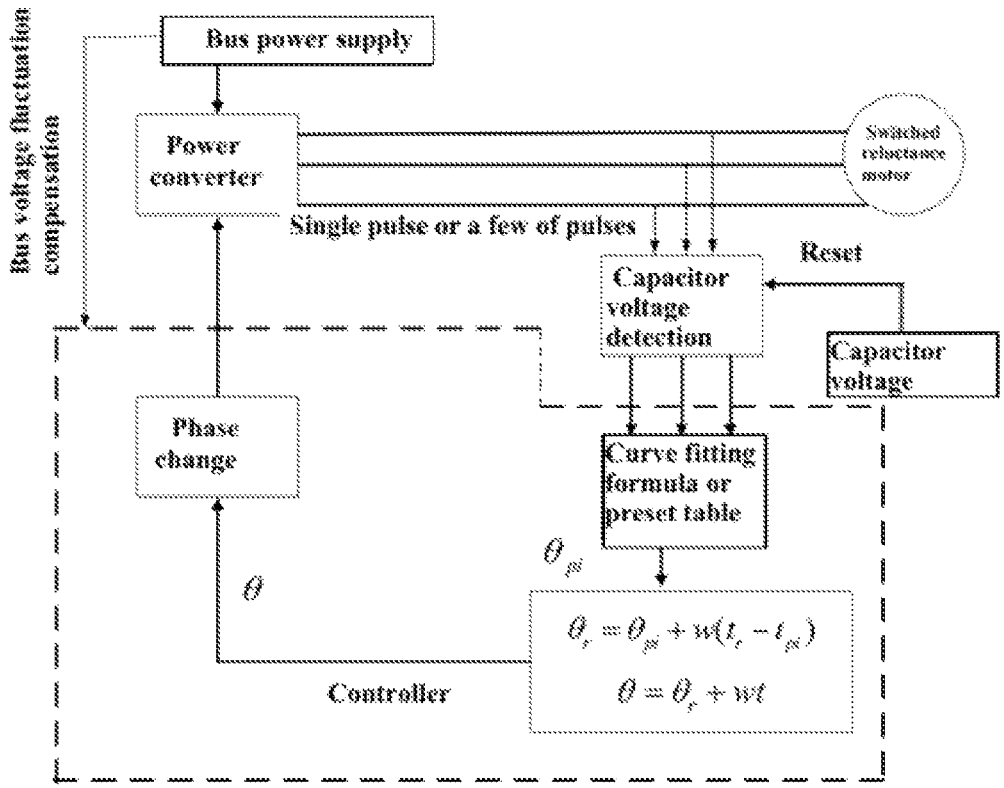
FIG. 6 is logic block diagram of a method for positioning a rotor of a switched reluctance motor with the pulse number being self-adjustable along with speed disclosed by an embodiment of the present application.

Referring to FIG. 6, the current response at a certain position of the rotor and the capacitor are shown, so that the rotor position can be determined according to a current peak. The measurement accuracy of the current peak directly affects the rotor position estimation. A single-pulse current is hard to capture in an actual system. Particularly, at a high speed, the chip cannot achieve fast enough sampling to capture the peak of the current pulse. In this method, a capacitor voltage detection method is used to map a real-time rotor position, which solves the problem that the sampling frequency of the chip under a high-speed working condition is solved. The power converter is connected to the bus voltage and the switched reluctance motor; and current responses corresponding to different rotor positions under the same voltage duty ratio are different. Due to this characteristic, a mapping relationship between a charging voltage and the rotor position is first acquired and is represented through a preset curve or table; when the high-speed working condition is determined, the capacitor is charged by a current under a fixed voltage pulse; the controller chip samples a voltage value finally output from the capacitor side; a corresponding real-time rotor position is queried according to the capacitor charging voltage and the pre-determined relationship between a voltage and a rotor position; and after the output measurement is completed, stored electricity is discharged through a discharging capacitor, so as to achieve resetting. Resetting ensures that an initial condition at the beginning of integration of each pulse is zero, which is convenient for calculation. The voltage on two sides of the capacitor and the pulse peak of the current change proportionally. As the rotor position changes, the rotor position is estimated according to an amplitude of the voltage at the capacitor side. The relationship between an integrator and the rotor position can be linearly fit or is stored in a preset table; and the corresponding rotor position is calculated or queried subsequently according to the acquired capacitor voltage.

For a corresponding special rotor position point $θ_{point}$, the real-time rotor position θ is calculated through the special position point. The calculation formula of θ is: $θ=θ_{pi(k)}+w_{pre}t_p$, wherein $w_{pre}$ is a predicted speed, which is calculated according to the last phase change cycle $θ_{pi(k-1)}$ and this phase change cycle $$θ_{pi(k)}; w_{pre} = \frac{θ_{pi(k)} - θ_{pi(k)}}{\Delta t}.$$

wherein Δt is time taken for twice consecutive capacitor voltage sampling; $t_p$ is time starting from the special position point $θ_{pi}$.

Figure 7:
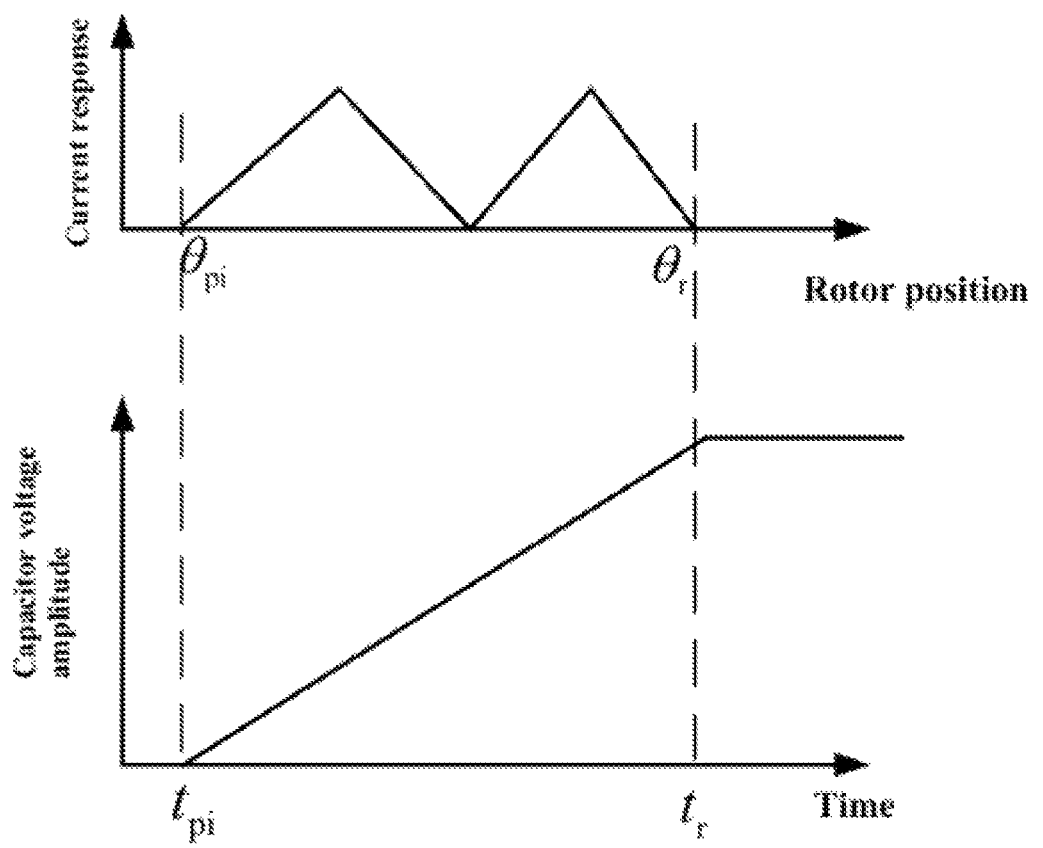
FIG. 7 is a current distribution diagram during excitation of a single pulse in a method for positioning a rotor of a switched reluctance motor with the pulse number being self-adjustable along with speed disclosed by an embodiment of the present application.

In FIG. 7, a pre-defined two-dimensional table of a pulse injection position is preset according to the amplitude of the capacitor voltage; and the capacitor voltage is measured at certain time after the current pulse is attenuated to 0. At this time, the rotor will move from the previous pulse injection position $θ_{pi}$ to a new position $θ_r$. The position where the capacitor voltage is captured is $θ_r$. Therefore, this time difference also needs to be considered and compensated. When a capacitor voltage output amplitude ($O_r$) is measured, the estimated rotor position is changed to be:

$$θ_r = θ_{pi} + ω(t_r - t_{pi})$$

wherein ω is an actual speed; $t_{pi}$ is time counted during pulse injection; and $t_r$ is time when an integrated pulse amplitude is read. Once the position $θ_{pi}$ of a given pulse is determined by table lookup or fitting calculation, $θ_r$ can be found by considering a displaced position ($ω(t_r-t_{pi})$) during the pulse injection. After $θ_r$ is determined, the rotor position at any time can be obtained: $θ=θ_r+ωt$; a single pulse or a plurality of pulses are injected into the idle phases of the motor in sequence; and in one electric cycle, each idle phase generates $θ_r$. The rotor position θ is estimated by the injection phase until $θ_r$ is updated from the next idle phase, and ω is assumed.

Matters not mentioned in the present invention are known art.

The above-mentioned embodiments are merely illustrative of the technical concept and characteristics of the present invention, and the purpose is to enable those who are familiar with the art to understand the content of the present invention and implement the content accordingly, and should not limit the protection scope of the present invention. All equivalent changes or modifications made according to the spirit of the present disclosure shall fall within the protection scope of the present disclosure.

The invention claimed is:

1. A method for positioning a rotor of a switched reluctance motor with a pulse number being self-adjustable along with speed, characterized in that a relationship between an instantaneous voltage of the switched reluctance motor and a magnetic flux in a winding is defined into formula (1), formula (1) being as follows:

$$V_{ph} = iR + \frac{\partial \lambda}{\partial i}\frac{di}{dt} + \frac{\partial \lambda}{\partial \theta}\frac{d\theta}{dt} = iR + L_{inc}\frac{di}{dt} + K_v \omega$$

wherein $V_{ph}$ is a direct current bus voltage; i is an instantaneous phase current; R is a resistance of the winding; λ is magnetic flux of a connecting coil; $L_{inc}$ is an incremental inductance; $K_v$ is a current-dependent counter electromotive force coefficient; ω is an angular speed of a rotor; working conditions of the switched reluctance motor are divided into a low-speed section, a medium-speed section and a high-speed section according to formula (1) in combination with a speed of the switched reluctance motor;

wherein estimation of a motor rotor position at the low-speed section comprises: using one phase to drive excitation, and using other two idle phases to determine the rotor position of the switched reluctance motor; injecting a high-frequency current into the idle phases; selecting a sector for triggering according to comparison between a current response value and a current threshold, so as to determine the rotor position of the motor;

estimation of a motor rotor position at the medium-speed section comprises: determining, according to a change of the number of injected pulses with the motor speed, the rotor position of the motor by querying a preset data table;

estimation of a motor rotor position at the high-speed section comprises: setting a preset data table to represent a mapping relationship between a charging voltage and the rotor position; comparing the motor speed with a set threshold; charging a capacitor by a current response under a fixed voltage pulse, and collecting a voltage amplitude output by a capacitor side; querying the preset data table to obtain a corresponding real-time rotor position of the motor according to a capacitor charging voltage value.

2. The method for positioning a rotor of a switched reluctance motor according to claim 1, characterized in that in the estimation method for the motor rotor position at the low-speed section, the current threshold comprises a low threshold and a high threshold; when a peak of the current response is less than the low threshold, a sector is selected to trigger phase driving excitation, so as to determine the rotor position of the motor; when the peak of the current response is greater than the high threshold, a sector is selected to trigger a position estimation algorithm, so as to determine the rotor position of the motor, and the current threshold is also adjusted along with the motor speed and can be specifically determined according to a relationship between an actual speed and a current threshold of a certain special position point.

3. The method for positioning a rotor of a switched reluctance motor according to claim 2, characterized in that the selection of the sector is achieved based on threshold triggering; the threshold is kept constant by a voltage proportionally-changed duty ratio; the voltage proportionally-changed duty ratio is determined by measuring a discrete voltage value and fitting; a fitting relational expression is as follows:

$$I_{th} = m(\theta) U_{dc} + n(\theta)$$

wherein $m(\theta)$ and $n(\theta)$ are coefficients; wherein a specific method for acquiring the coefficients comprises: selecting one phase; enabling the rotor to rotate to a rotor angle corresponding to a threshold current $I_{th}$; fixing the motor rotor; injecting a voltage pulse with a fixed duty ratio; changing a bus voltage; acquiring current peak discrete data at different bus voltages; and substituting the data into the formula to calculate coefficient values.

4. The method for positioning a rotor of a switched reluctance motor according to claim 1, characterized in that at this moment, the number of injected pulses changes with the motor speed, and is selected and determined according to data of a preset curve or table; the data of the preset curve or table here is determined according to an actual need; when the motor speed is high, injected pulses are added, and the number of pulses within one phase change cycle is increased, so as to improve a rotor position recognition degree.

5. The method for positioning a rotor of a switched reluctance motor according to claim 1, characterized in that in the estimation method for the motor rotor position at the high-speed section, features of the current response are acquired by a method for collecting a capacitor voltage; and problems that a small number of voltage pulses can be injected at a high speed and a peak of the current response is hard to capture are solved.

6. The method for positioning a rotor of a switched reluctance motor according to claim 5, characterized in that in the estimation method for the motor rotor position at the high-speed section, the capacitor voltage is detected; an angle corresponding to a special position point is determined according to a mapping relationship between a voltage and an angle described in a preset curve or table, so that rotating speed of the rotor and rotor positions at different moments are measured.

* * * * *